United States Patent

Ackermann et al.

[11] Patent Number: 5,564,755
[45] Date of Patent: Oct. 15, 1996

[54] MEANS FOR FIXING A CONNECTING FITTING ON A SINTERED METALLIC FILTERING ELEMENT

[75] Inventors: Luc Ackermann, Herbeys; Henri Gueydan, Moirans; Thierry Montfollet, Seyssins; Michel Tollar, La Motte St. Martin, all of France

[73] Assignee: Sintertech, Pont de Claix, France

[21] Appl. No.: 338,525

[22] PCT Filed: Apr. 7, 1994

[86] PCT No.: PCT/FR94/00390

§ 371 Date: Nov. 30, 1994

§ 102(e) Date: Nov. 30, 1994

[87] PCT Pub. No.: WO94/24476

PCT Pub. Date: Oct. 27, 1994

[51] Int. Cl.$^6$ .................................. B01D 39/20
[52] U.S. Cl. ...................... 285/191; 55/505; 55/523; 285/206
[58] Field of Search .................... 285/206, 420, 285/421, 200, 205, 191, 123; 411/395, 399; 55/502, 505, 523; 210/323.2, 500.25, 500.23, 497.01

[56] References Cited

U.S. PATENT DOCUMENTS

| | | | |
|---|---|---|---|
| 2,348,490 | 5/1944 | Newman et al. | 285/206 |
| 3,722,186 | 3/1973 | Parker et al. | 55/505 |
| 4,731,184 | 3/1988 | Ostreicher et al. | 210/497.1 |
| 4,735,638 | 4/1988 | Ciliberti et al. | 55/523 |
| 4,968,467 | 11/1990 | Zievers | 55/523 |
| 5,098,454 | 3/1992 | Carpentier et al. | 55/523 |
| 5,249,882 | 10/1993 | Nagoshi et al. | 411/399 |

*Primary Examiner*—Eric K. Nicholson
*Attorney, Agent, or Firm*—Dennison, Meserole, Pollack & Scheiner

[57] ABSTRACT

A sintered metallic filtering element in the form of a porous metallic tube is provided with a connecting fitting by forming the tube with an internal surface in the form of an internal truncated cone of circular cross section at one end of the tube, the internal truncated cone having a vertex half angle $\alpha$ greater than zero. The connecting member of the invention includes a truncated cone shaped head of circular external cross section having a vertex half angle $\alpha$ which is the same as the vertex half angle $\alpha$ of the internal truncated cone of the tube. The head of the connecting member is disposed inside the porous metallic tube and cooperates with the internal truncated cone. The connecting member also includes a tubular extending member attached to the smaller end of the head, with the tubular extending member extending beyond the porous metallic tube.

6 Claims, 2 Drawing Sheets

MEANS FOR FIXING A CONNECTING FITTING ON A SINTERED METALLIC FILTERING ELEMENT

BACKGROUND OF THE INVENTION

The present invention relates to a process for fixing a fitting on a sintered metallic filtering element and to the product thus obtained.

Metallic filtering elements are generally produced by sintering a metal powder, for example of 316 type stainless steel according to the AISI nomenclature, by adjusting the porosity to obtain the desired filtering effect while having the slightest possible loss of charge for a given flow rate; they are generally in the form of a cylindrical tube which is closed at one end and comprises, at the other end, a fitting producing the connection to a load-bearing structure such as a plate perforated by orifices. This unit is frequently called a "candle filter". According to the prior art, the fitting is either welded to the porous tube or is metallurgically fixed thereon during sintering.

The first solution has the following drawbacks:

welding leads to the presence of a region which is affected by heat and is generally more fragile the weld obtained has to be perfectly sound, the presence of fissures generally leading to poor filtration and, in certain cases, to mechanical breakages, particularly if the weld is located close to the fixing, that is to say in a region where the bending moment (due to vibrations for example) is high.

In the second solution, a solid metallic fitting is positioned at one end of the cold compression mould (for example by isostatic pressure) before introduction of the powder into the annular space delimited by a central mandrel and the external flexible casing of plastics material. After compression, the unit is sintered, producing a metallurgical connection between the fitting and the tube.

However, this method has the following drawbacks:

the poorly controlled shrinkage during sintering can lead to local detachment or fissuring in the region of the connecting interface the length of the candle cannot be adjusted after sintering and is therefore subject to variations the technique employed prevents compression through the interior of the tube the fitting has to have dimensions and a shape close to that of the porous tube.

SUMMARY OF THE INVENTION

The method according to the invention allows the aforementioned drawbacks to be overcome.

It involves:

on the one hand, producing an externally cylindrical, porous sintered tube of which the connecting end has excess thickness delimited by a circular internal truncated cone and having a half angle at the vertex $\alpha=0$ on the other hand, producing a tubular connecting member which generally has an external thread, is equipped with a truncated cone-shaped end and has the same half angle at the vertex $\alpha$ as the sintered tube force fitting the tubular connecting member in the tube so that the mean normal stress between the two aforementioned coupled elements is greater than twice the mean normal stress imposed by the mounting of the candle on its support.

More specifically, the method involves:

on the one hand, producing an externally cylindrical porous sintered tube of which the connecting end has an excess thickness delimited by a circular internal truncated cone and having a half angle at the vertex $\alpha$ of between 4° and 7° over a height (h) of between 20 and 80 mm on the other hand, producing a tubular connecting member which is generally externally threaded, is equipped with a truncated cone-shaped end and has the same half angle at the vertex as the sintered tube over a height h' which is smaller than h, of which the small diameter (d) is greater than the orifice of the tube (t) and of which the large diameter (D) is smaller than the internal diameter of the tube (Ti).

force fitting the tubular connecting member in the tube so that the mean normal stress between the two aforementioned coupled elements is greater than twice the mean normal stress imposed by the mounting of the candle on its support (and remains greater than 2 MPa).

In a preferred embodiment, the lateral surface of the truncated cone is equipped with one (or more) annular ribs having any cross-sectional profile, but preferably polygonal (for example triangular) with sharp corners which impress themselves in the porous tube during the force fitting operation.

If the candle is mounted directly on its support, the widened end of the sintered tube has an annular housing for a seal (for example an O ring).

The candle may also be mounted on its support with an intermediate member which is a screw nut having an annular housing for a seal on its free face. In this case, it is preferable for this nut to carry, on its surface in contact with the widened end of the filtering tube, one (or more) annular rib(s) similar to those of the conical fitting which also impresses itself in the porous tube when installed. This nut may have the form of a tubular sleeve equipped with two end flanges if a filtering zone at the head of the porous tube is to be eliminated over a certain length.

BRIEF DESCRIPTION OF THE DRAWINGS

The invention will be understood better by means of the following drawings and by the following embodiment.

DESCRIPTION OF THE PREFERRED EMBODIMENTS

A filtering element 1 is composed of a sintered porous metallic tube 2 of 316 stainless steel having dimensions of ∅56×∅60×1000 mm and having a welded base 3 of 316 stainless steel. The upper part is widened in the form of an internal truncated cone having a height h=50 mm with a half angle at the vertex $\alpha=5°$.

Figure 1:
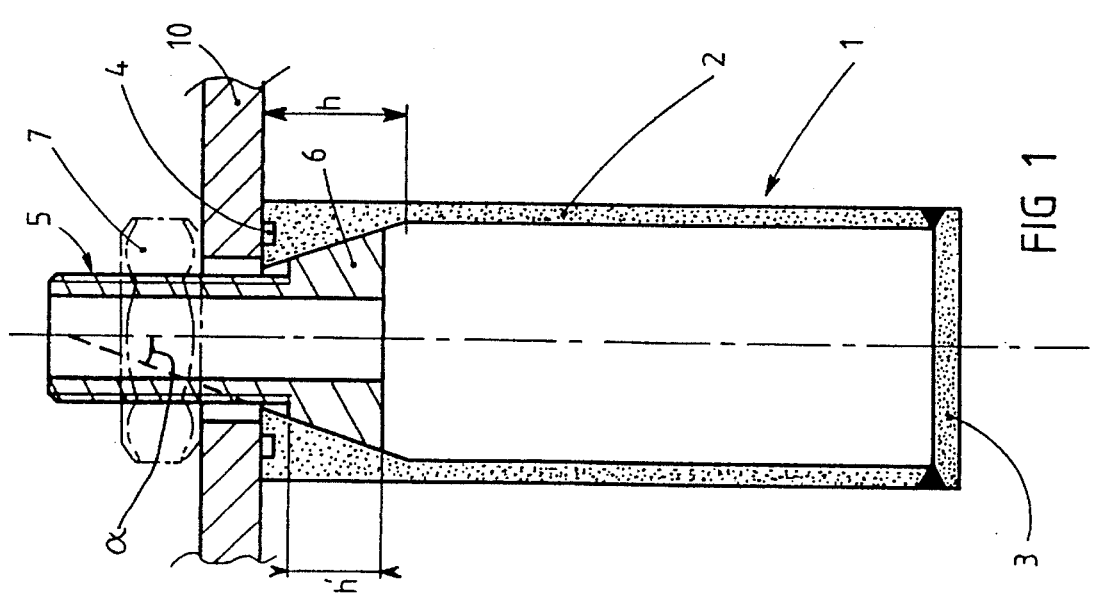
FIG. 1 is a section of a candle according to the invention.

It is equipped with an annular housing 4 for a seal (not shown) in FIG. 1. An externally threaded tubular fitting 5 has a truncated cone-shaped head 6 of height h'=30 mm and vertex half angle=5°. This fitting 5 was introduced into the tube 2 and applied by pressure with a force of 30,000 N, that is a mean normal stress at the interface between 6 and 2 of about 10 MPa. The unit is mounted on the support 10 by means of a nut 7.

Figure 2:
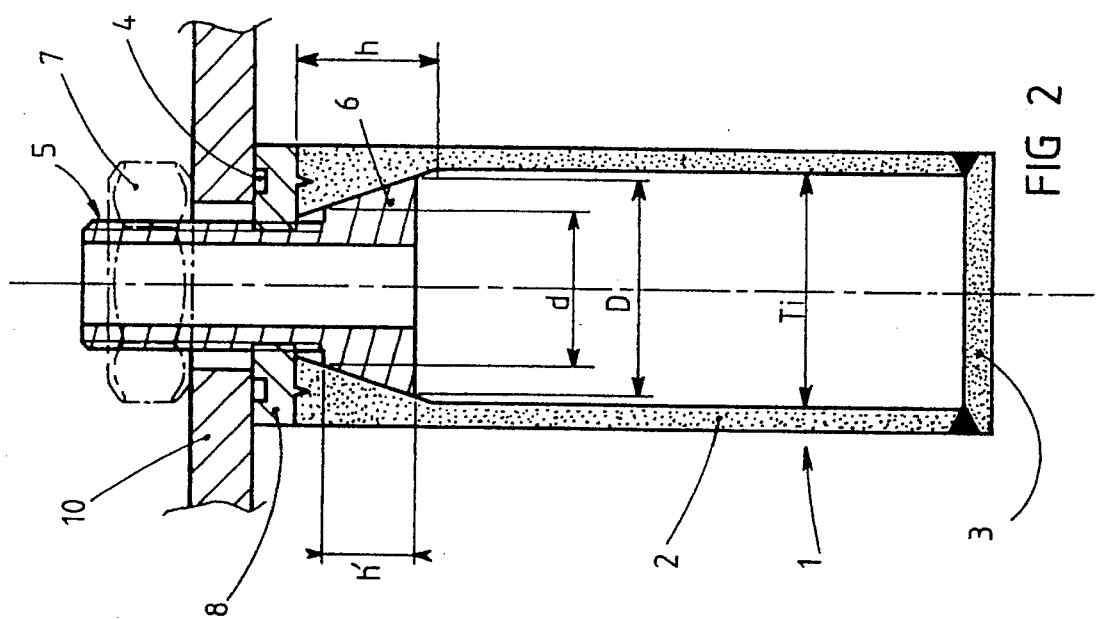
FIG. 2 is a section of a different embodiment of the invention.

FIG. 2 shows the same elements except with regard to a nut 8 screwed on the fitting 5, the fitting 5 comprising an annular groove 4 for a seal.

Figure 3:
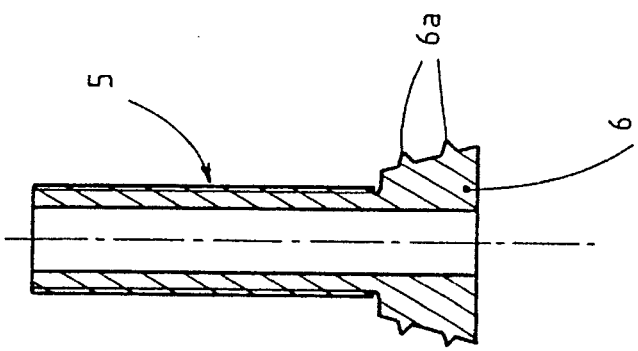
FIG. 3 is a section (detail) of the truncated cone-shaped part with ribs.

FIG. 3 shows a fitting 5 having, on the lateral surface of the truncated cone-shaped part 6, two rings 6a having a triangular cross section and a height of 0.3 mm.

Figure 4:
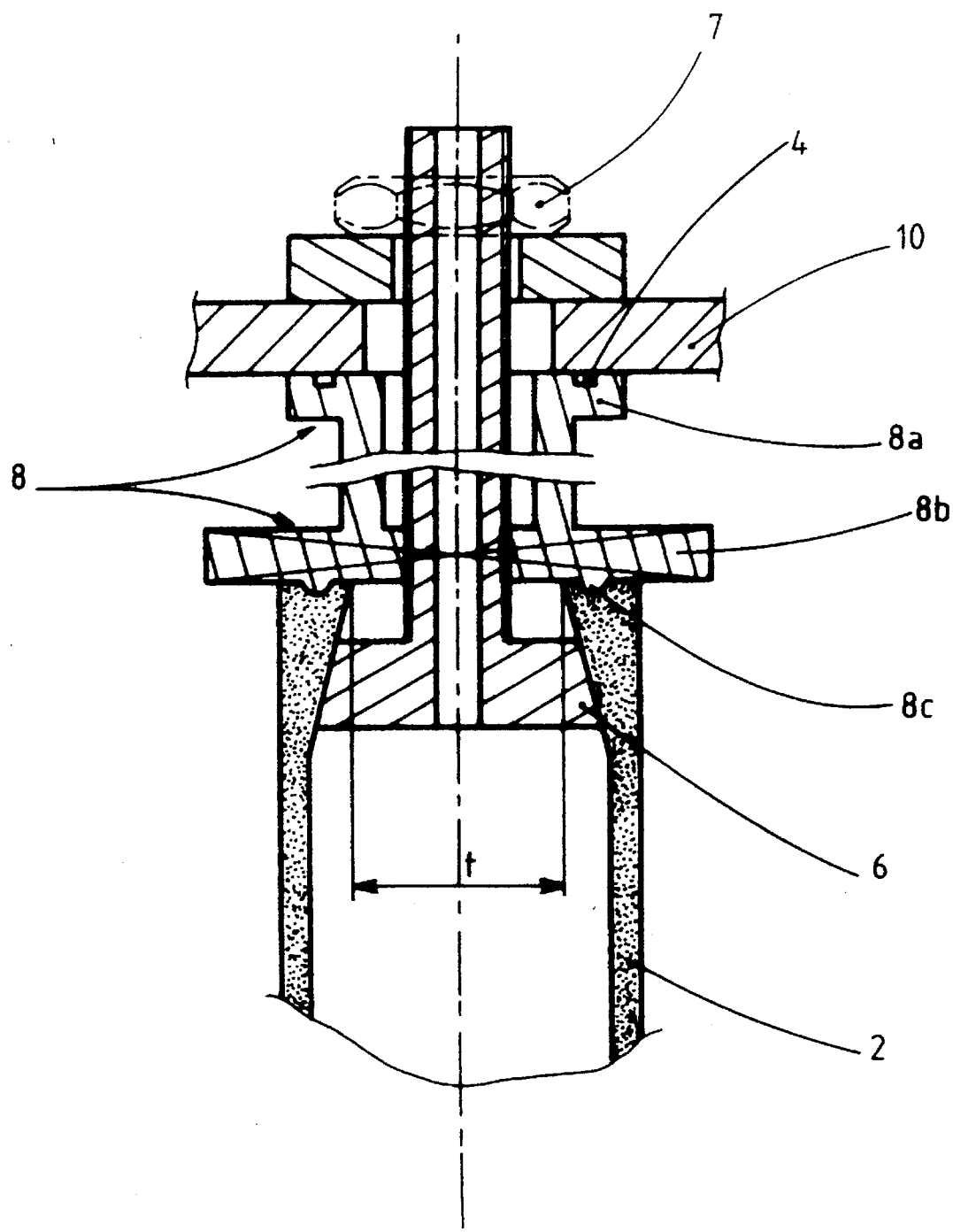
FIG. 4 is a section of a tubular intermediate member.

FIG. 4 shows a connection comprising a nut 8 consisting of a tubular part and of two flanges (8a, 8b) and having a circular rib of semi-circular cross section 8c (r=0.3 mm) in line with the widened end of the porous tube 2.

In addition to the elimination of the aforementioned drawbacks, it should be noted that the process according to the invention densifies the porous tube in the vicinity of the connection between 2 and 6 and this locally increases its mechanical characteristics (hardness, resistance to fatigue) in this mechanically stressed region.

This method allows the production of a connection in which the nut 8 has transverse bulk which is significantly greater than the diameter of the porous tube 2, and this does not allow the connection to be produced easily during sintering (complex pressing tool).

Furthermore, the normal stress imposed at the interface between 2 and 6 is not modified when the filtering device is mounted on its support (nuts 7 and/or 8).

What is claimed is:

1. In combination:
   a) a sintered, porous metallic tube having a cylindrical external surface, and a constant external diameter, and an internal surface which is in the form of an internal truncated cone of circular cross section at one end of the tube having a vertex half angle $\alpha$ greater than zero, whereby said tube has a wall thickness which increases at said one end of the tube and an internal diameter which decreases from a maximum to a minimum; and
   b) a connecting member comprising a truncated cone-shaped head of circular external cross section having a vertex half angle $\alpha$ the same as the vertex half angle $\alpha$ of the internal truncated cone of the porous metallic tube, and a tubular extending member attached to the head at an end of the head of smaller diameter, said head being disposed inside said porous metallic tube and cooperating with said internal truncated cone with said tubular extending member extending beyond said porous metallic tube.

2. The combination of claim 1, wherein the internal truncated cone has a vertex half angle $\alpha$ of 4° to 7° over a height of 20 to 80 mm, and the connecting member has a truncated cone-shaped head of height less than the height of the internal truncated cone, the truncated cone-shaped head having a minimum diameter greater than the minimum internal diameter of the porous tube, and a maximum diameter less than the maximum internal diameter of the porous tube.

3. The combination of claim 2, further comprising a nut disposed externally at said one end of the porous metallic tube and including an annular housing for a seal.

4. The combination of claim 3, wherein the nut comprises at least one circular rib on a surface thereof in contact with the porous metallic tube.

5. The combination of claim 3, wherein the nut comprises a tubular sleeve equipped with two end flanges.

6. The combination of claim 1, wherein said truncated cone-shaped head comprises a lateral surface having at least one anchoring rib thereon.

* * * * *